(12) United States Patent
Fraser (10) Patent No.: US 8,262,017 B2
(45) Date of Patent: Sep. 11, 2012

(54) AIRCRAFT WITH FORWARD LIFTING ELEVATOR AND RUDDER, WITH THE MAIN LIFTING SURFACE AFT, CONTAINING AILERONS AND FLAPS, AND AIRBRAKE

(76) Inventor: Norman T. L. Fraser, Seal Beach, CA (US)

( * ) Notice: Subject to any disclaimer, the term of this patent is extended or adjusted under 35 U.S.C. 154(b) by 303 days.

(21) Appl. No.: 12/758,512

(22) Filed: Apr. 12, 2010

(65) Prior Publication Data

US 2011/0248124 A1   Oct. 13, 2011

(51) Int. Cl.
*B64C 39/12* (2006.01)
(52) U.S. Cl. .................... 244/45 R; 244/35 R; 244/45 A
(58) Field of Classification Search ............... 244/35 R, 244/45 A, 45 R, 199.4, 91, 198, 34 A, 117 R, 244/119, 87, 88, 89; D12/319, 345, 331
See application file for complete search history.

(56) References Cited

U.S. PATENT DOCUMENTS

| | | | |
|---|---|---|---|
| 2,874,922 A | 2/1959 | Whitcomb | |
| 2,898,059 A | 8/1959 | Whitcomb | |
| 3,954,231 A * | 5/1976 | Fraser | 244/225 |
| 4,390,150 A | 6/1983 | Whitener | |
| 4,482,109 A | 11/1984 | duPont | |
| 5,114,097 A | 5/1992 | Williams | |
| D451,879 S | 12/2001 | Fraser | |
| D453,014 S | 1/2002 | Fraser | |
| 6,626,401 B2 * | 9/2003 | Fraser | 244/221 |
| D484,451 S * | 12/2003 | Fraser | D12/319 |
| D494,530 S | 8/2004 | Fraser | |
| D494,531 S | 8/2004 | Fraser | |

\* cited by examiner

*Primary Examiner* — Timothy D Collins
*Assistant Examiner* — Nicholas McFall
(74) *Attorney, Agent, or Firm* — James Addison Barry, Jr.

(57) ABSTRACT

An area ruled forward lifting elevator aircraft [100] comprising a fuselage [120]; area ruling [600] throughout the length of the fuselage [120]; an airbrake [400] at the rear of the fuselage; an aircraft propulsion system [140]; and lifting surfaces that include a forward lifting [200] surface and an aft lifting [300] surface. The inner portion [210] of the forward lifting surfaces [200] move outward from the top fuselage [120] with a V shape forming a large dihedral angle at the fuselage [120] wherein the inner portion of the forward lifting surfaces act as rudder [250] and also act as elevator[ 260]. The inner V shaped portion [210] of the forward shaped lifting surfaces [200] is swept forward, and at the junction [215] with the outer surface [220], this surface changes to an aft swept design. The main aft lifting wing allows for an area rule system.

6 Claims, 5 Drawing Sheets

AIRCRAFT WITH FORWARD LIFTING ELEVATOR AND RUDDER, WITH THE MAIN LIFTING SURFACE AFT, CONTAINING AILERONS AND FLAPS, AND AIRBRAKE

CROSS-REFERENCE

U.S. Pat. Nos. 3,954,231 and 6,626,401 are hereby incorporated in its entirety by reference. The present application and the incorporated patents share the same inventor.

FIELD OF INVENTION

The present invention relates to an area ruled aircraft with two positive lifting surfaces, one fore and the other aft. More specifically, an aircraft wherein forward surfaces have elevator and rudder controls; a vertical split air brake flap at the aft end of the fuselage; and the aircraft comprises area ruling applied throughout the total airplane length.

BACKGROUND OF INVENTION

Most conventional aircraft in use are designed with the main wing surfaces forward of the conventional rearwardly placed tail surfaces. Takeoff and landing requires negative tail lifting, which adds to the main forward wing loading at a time when this condition is least desirable. Most conventional aircraft also have very complex leading edge slats on the main wing surfaces. These leading edge slats are costly to manufacture and are heavy items.

SUMMARY

The present invention provides an area ruled aircraft with two positive lifting surfaces, one fore and the other aft wherein the forward surfaces have elevator and rudder controls; a vertical split air brake flap at the end of the fuselage; and the aircraft comprises area ruling applied throughout the total airplane length. With forward and aft lifting surfaces including elevator and rudder controls, the total forward and aft lifting surfaces are of lesser area than comparable conventional main forward wing aircraft with conventional ailerons and flaps. The vertical split air brake flap at the end of the fuselage gives reaction to the aft main wing flaps when employed.

The forward lifting and flight controlling aircraft do not have a large advantage over conventional aircraft until the aircraft is in the 50-60 passenger category and larger. The main aft wing may be brought forward from the end of the aircraft fuselage such that the aircraft is balanced by placing engines that may be supported by pods, on the aft fuselage. This advantage is such that trailing edge flaps can be used on the main aft wing surfaces.

BRIEF DESCRIPTION OF THE DRAWINGS

These and other features, aspects, and advantages of the invention will become better understood with regard to the following description, appended claims, and accompanying drawings where:

DETAILED DESCRIPTION OF THE INVENTION

The present invention relates to the field of an area ruled aircraft with two positive lifting surfaces, fore and aft. More specifically to an aircraft wherein forward surfaces have elevator and rudder controls; a vertical split air brake flap at the end of the fuselage; and the aircraft comprises area ruling applied throughout the total fuselage length. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Overview:

As illustrated in FIGS. 1 through 10, an area ruled forward lifting elevator aircraft 100 comprises a fuselage 120; area ruling 600 throughout the length of the fuselage 120; an airbrake 400 at the rear of the fuselage such that the vertical surface of the airbrake 410 is set at an angle between a vertical and a horizontal; an aircraft propulsion system 140; and at least two lifting surfaces that include a forward lifting surface 200 and an aft lifting 300 surface. The aft lifting 300 surface also referred to as the main aft wing, and the forward lifting surface 200 also referred to as the forward wing, are designed to accommodate, airplane speeds of high sub-sonic, through supersonic speeds. The area ruled forward lifting elevator aircraft 100 is more efficient during all phases of flight and especially during takeoff and landing as well as at aircraft speeds of 0.80 Mach and above by eliminating negative lifting wings such as conventional elevators and eliminating unnecessary drag at higher speeds by incorporation of area rule design with the area ruled forward lifting elevator aircraft 100. The subject of the invention is found in the rearranging of the parts necessary to form the most efficient, less drag, less weight, less complex, high-speed practical aircraft. The area ruled forward lifting elevator aircraft 100 includes at least two lifting wing surfaces wherein both of the wing surfaces are lifting surfaces 200, 300. The larger area wing surface 300 is aft, the lesser area wing surface 200 is forward. The design is such that the main wing or aft lifting surface 300 never stalls. By design the forward wing 200 always stalls first. Apart from being naturally safer in flight than the normal configuration, both wings 200, 300 lift, which makes for reduced weight and drag, and also produces a very considerable improvement in permissible center of gravity range of three times greater than the conventional aircraft. The above advantages also make for a less costly, less fuel consuming aircraft and less costly to produce.

Design Specifications:

The area ruled forward lifting elevator aircraft 100 comprises a fuselage 120; at least two main lifting wing surfaces 200, 300 that may be equipped with ailerons 320 and flaps 340 on the aft lifting surface 300 such that the ailerons 320 and flaps 340 are aft in relation with the fuselage 120 and forward lifting surfaces 200 of reduced area in relation to the aft lifting surfaces 300 and the forward lifting surfaces 200 include both rudder 250 and elevator 260 components; area ruling 600 throughout the length of the fuselage; and a propulsion system 140. The area ruled forward lifting elevator aircraft 100 is the result of an overall systems approach for design. Therefore it is difficult to reduce the invention to any single element or a basic combination of two elements. One of the novelties of this aircraft is the result of the combination of elements and the product of these combinations of systems.

Most conventional aircraft in use are designed with the main wing surfaces forward of the rearwardly placed tail surfaces. Takeoff and landing requires negative tail lifting, which adds to the main forward wing loading at a time when this condition is least desirable. Most conventional aircraft also have very complex leading edge slats on the main wing surfaces. The forward lifting elevator aircraft 100 does not require leading edge slats on the main aft wing that are costly to manufacture and are heavy items. The forward lifting and forward flight controlling aircraft do not have great advantage over conventional aircraft until the aircraft is in the 50-60 (passenger) category and larger in this category. The main aft lifting surface or wing 300 can be brought forward from the end of the aircraft fuselage, and by doing so, balance the aircraft by placing engines, supported by pods, on the aft fuselage. With the forward lifting elevator aircraft 100, the trailing edge flaps 340 can be used on the main aft wing lifting surfaces 300.

The Fuselage:

The area ruled forward lifting elevator aircraft 100 includes a fuselage 120. The fuselage 120 may be a constant section, pressurized fuselage with area ruling 600 applied throughout. The forward lifting 200 and aft lifting wing surfaces 300 and the airbrake 400 are attached with the fuselage 120. The propulsion system 140 may be attached with the fuselage 120 or the aft lifting wing surface 300. An area ruled outer area 620 may be attached to most of the fuselage 120 lengthwise for area ruling. Additional bagged fuel may be carried aft of the main landing gear and also forward of the main landing gear on each side of the fuselage. A principal attribute to this particular design of aircraft is to apply area ruling over the entire aircraft fuselage length. A means to employ fuselage length changes at approximately the mid-length of the fuselage with the aircraft is indicated in the various figures. This attribute may be viewed in FIG. 6 with the area ruled graph 600. A portion of the fuselage, shown flat 610 on the graph, may be removed from the fuselage length with a slight advantage to performance of the aircraft. The basic significance of the value of area ruling is unaffected. This change, with the removal of one piece of fuselage section, would require two such pieces with the conventional aircraft, one section forward of the wing and one section aft.

Power Plants/Propulsion Systems:

As illustrated in FIGS. 1 through 5 and 8 through 10, the aircraft may accept almost any type of power plant or propulsion system 140 dependent upon the size of the aircraft. All pure jet engines and also open propellers may be accommodated at the rear of the fuselage or above the main aft lifting surface wing 300, at a typical span length, mounted on upper wing pylons, with a forward propeller rotating forward of the leading edge of the wing, or aft rotating free of the wing trailing edge. (See FIGS. 9 and 10.) The propulsion system or the at least two power plants 140, may be mounted at the aircraft rear fuselage in a conventional manner. Many types of existing engines may be used. The rear engine placement permits the use of new and existing types of engines. Open propeller designs may have propellers forward or placed at the rear of the engine and may contained propellers with geared fan design, to mention a few variations. The rear placement of the engines leads to a safer location. No significant control surfaces are located near the path of engine debris, should some parts dislocate. Engine noise is always under study and the aft engine location gives reduced engine noise within the passenger cabin.

Figure 7:
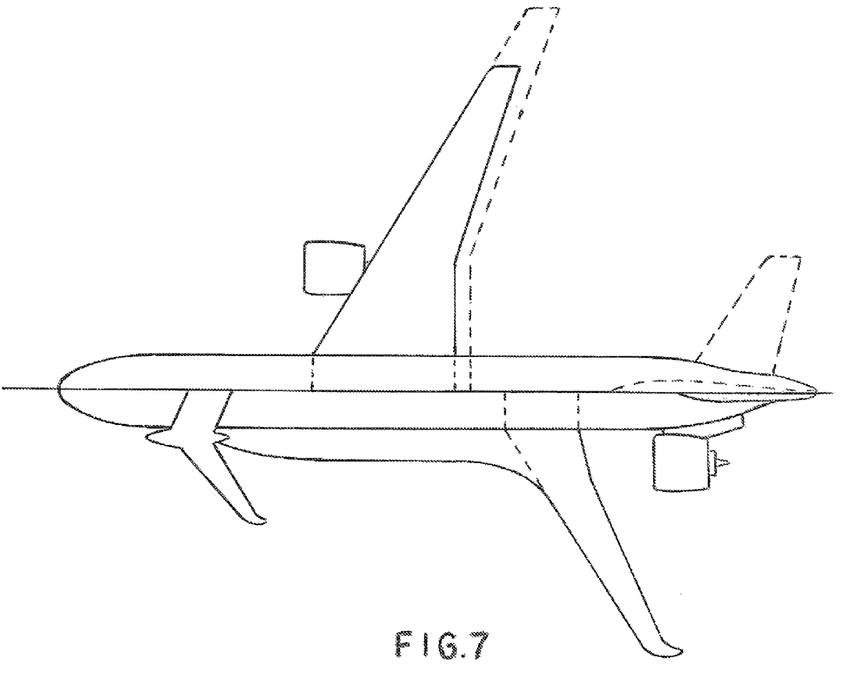
FIG. 7 is a plan view of one embodiment of the aircraft showing the comparative wing areas of the aircraft and a conventional aircraft of the same fuselage capacity (The left side of the center line, in solid lines, shows the lifting wing areas of the aircraft. The right side of the center line, in solid lines, shows a wing of similar lifting area to the new total lifting area: aft wing area to aircraft center line, plus total forward wing to center line plus area ruled area attached to the side of the fuselage. The dotted lines on the right of the center line of FIG. 7, including the dotted tail areas showing a comparative plan view of a competitive aircraft to the here being described aircraft with its obvious considerable advantages.)

Forward and Aft Lifting Wing Surfaces with Control Surfaces:

The present invention provides an area ruled aircraft including at least two positive lifting surfaces, fore and aft 200, 300 wherein the forward surfaces 200 have elevator 260 and rudder 250 controls and the aft surfaces 300 may have flaps 340 and ailerons 320; a vertical split air brake flap 410 at the end of the fuselage; and the fuselage 120 is of constant section, with area ruling applied throughout the total airplane length. With positive lifting surfaces, fore 200 and aft 300, the forward surfaces 200 have elevator 260 and rudder 250 controls and are of lesser surface area than conventional main aft wing aircraft with conventional ailerons and flaps. The vertical split air brake flap 410 at the end of the fuselage gives reaction to the aft main wing flaps 340 when employed. The design of the at least two lifting surfaces 200, 300 allow the lesser surface 200 area that is designed to stall first to be disposed forward, with the main lifting surface 300 that is designed not to stall to be disposed aft. The total forward lifting surface 200 is designed with typical trailing edge surfaces as shown in FIGS. 1 through 5 and 8 through 10. Comparative wing areas 200, 300 of the area ruled forward lifting elevator aircraft 100 and a conventional aircraft of the same fuselage capacity are depicted in FIG. 7. The left side of the center line, in solid lines, shows the lifting wing areas of the aircraft. The right side of the center line, in solid lines, shows a wing of similar lifting area to the new total lifting area: aft wing area to aircraft center line, plus total forward wing to center line plus area ruled area attached to the side of the fuselage. The dotted lines on the right of the center line of FIG. 7, including the dotted tail areas show a comparative plan view of a competitive aircraft to the area ruled forward lifting elevator aircraft 100 with its obvious considerable advantages.

Figure 2:
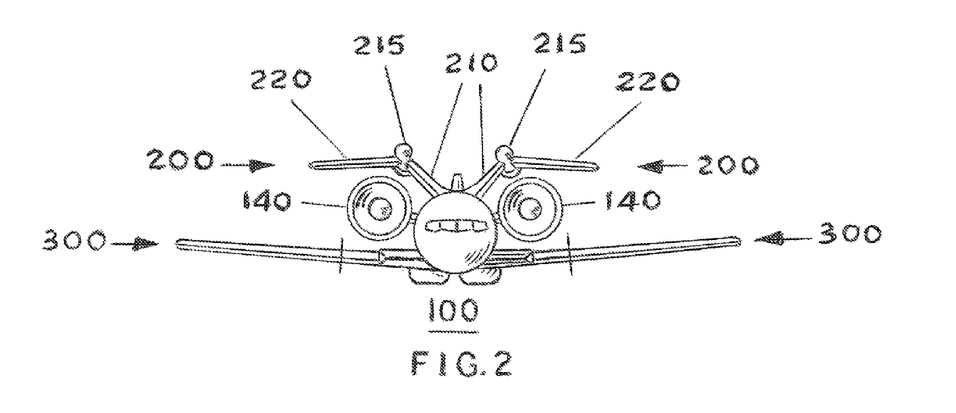
FIG. 2 is a front view of one embodiment looking on the nose of the aircraft.
Figure 3:
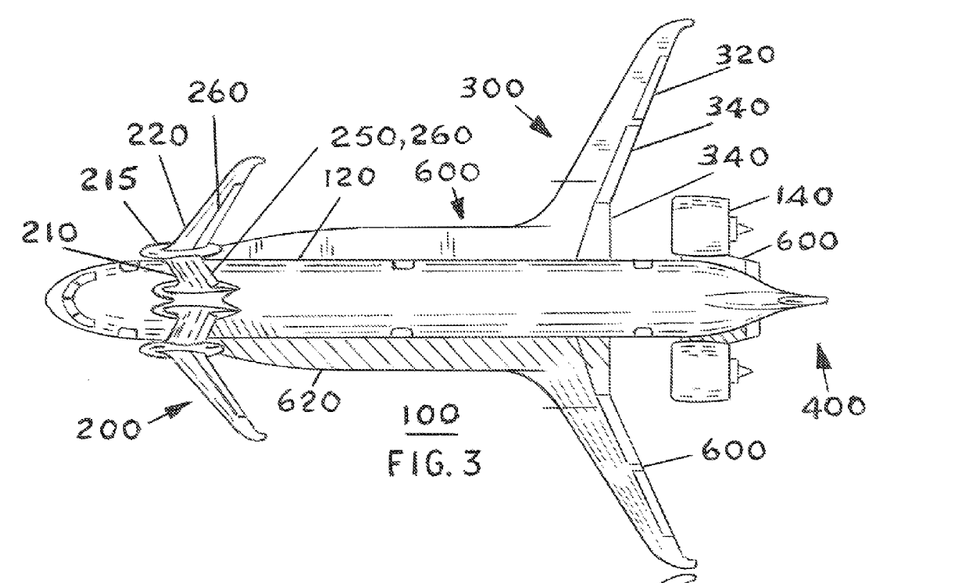
FIG. 3 is a plan view of one embodiment looking down on the aircraft depicting area ruling.
Figure 4:
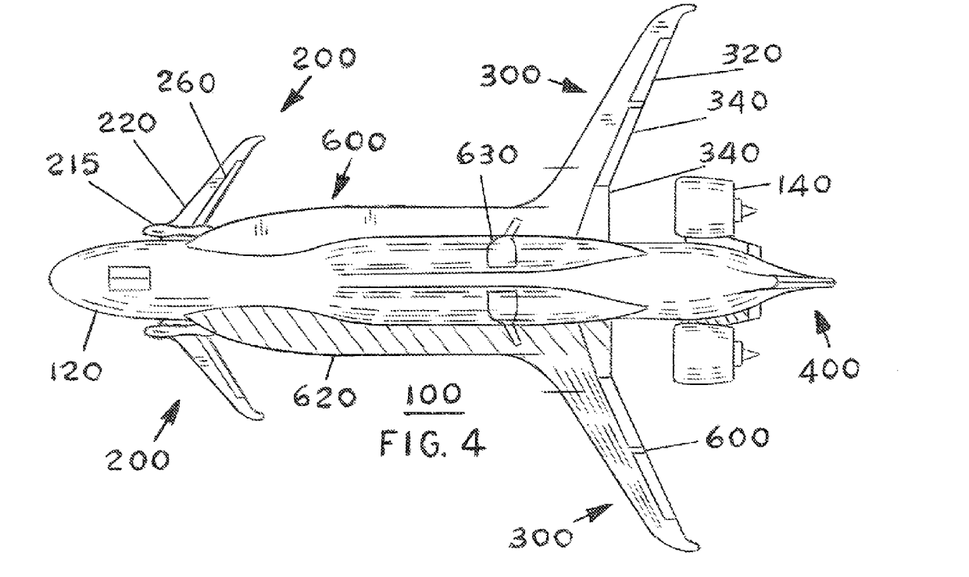
FIG. 4 is a plan view of one embodiment looking up on the aircraft illustrating area ruling.
Figure 5:
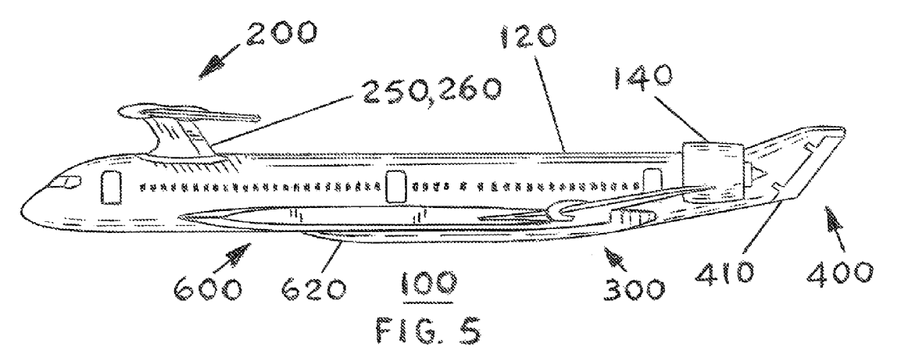
FIG. 5 is a side view of one embodiment of the aircraft depicting the forward wing with a rudder capability.
Figure 6:
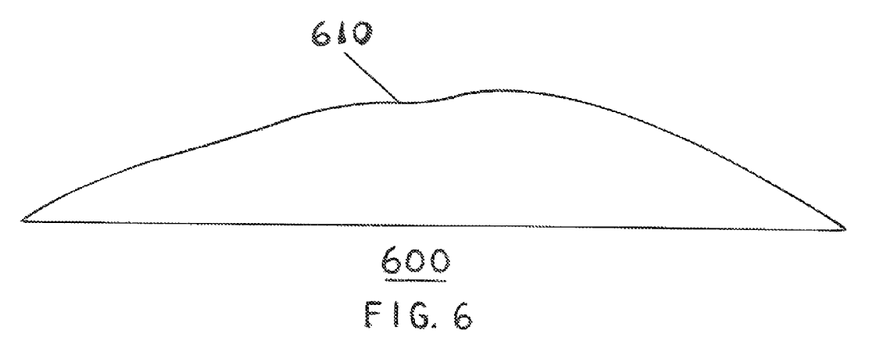
FIG. 6 is a graph showing the area ruling of the aircraft.
Figure 8:
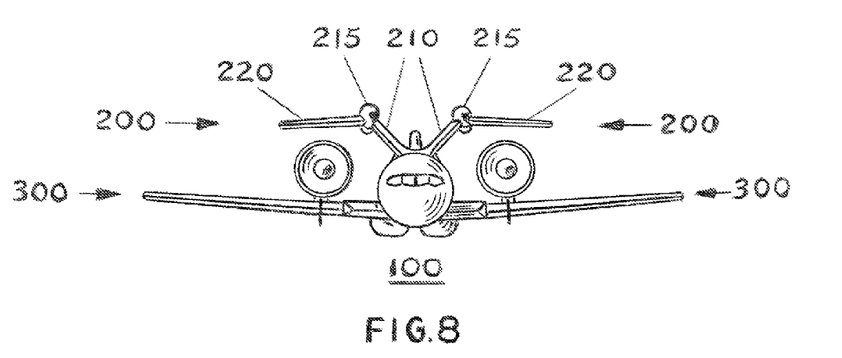
FIG. 8 is a front view of one embodiment of the aircraft looking on the nose of the aircraft with engines placed on the aft main wing.
Figure 9:
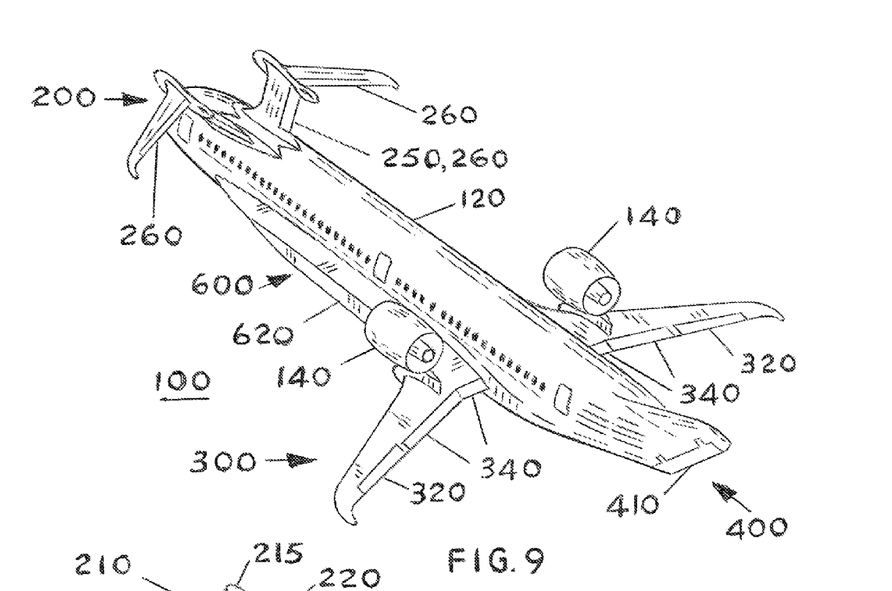
FIG. 9 is a perspective view of one embodiment of the aircraft with engines forward on the upper surfaces of the main aft wing.
Figure 10:
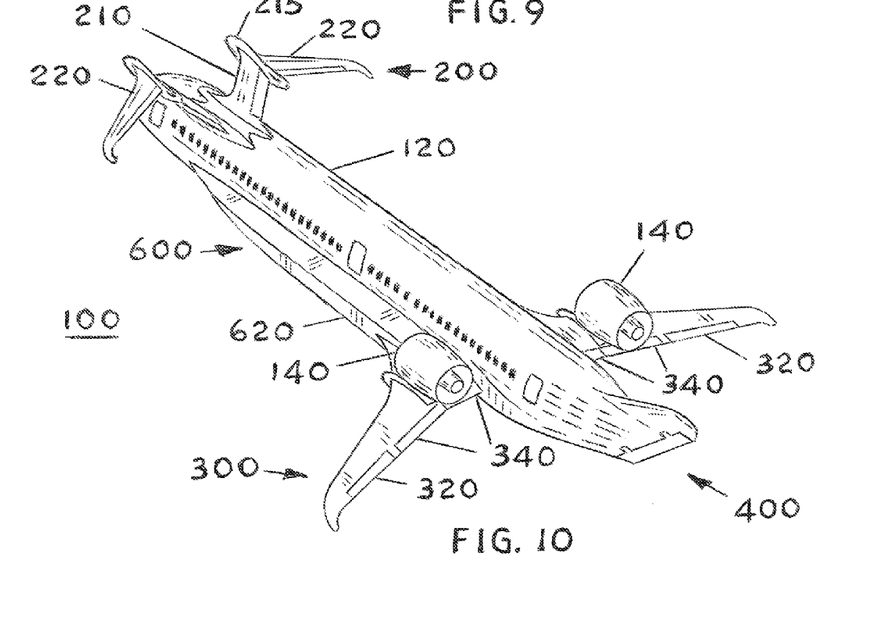
FIG. 10 is a perspective view of one embodiment of the aircraft with engines placed aft on the upper main surfaces of the main aft wing.

Forward Lifting Surfaces:

The inner portion 210 of the forward lifting surfaces 200 move outward from the top fuselage 120 of the aircraft with a V shape at a large dihedral angle at each side of the fuselage 120 as illustrated in FIGS. 2 and 8 wherein the inner portion of the forward lifting surfaces act as rudder and also act as elevator. The span of the forward lifting wing surfaces 200 extend further outboard past the inner portion of the forward lifting surfaces 200 at a slight anhedral angle with this lifting, elevating, outer portion of the forward lifting wing surfaces. The inner V shaped portion 210 is swept slightly forward from the vertical position and the outer portion 220 of the forward lifting surface is swept back. The area ruled forward lifting elevator aircraft 100 has by design, a unique stalling sequence resulting from the design of the forward lifting surface 200 in relation to the aft lifting surface 300.

The forward lifting surface 200 has the outer portion 220 of the forward lifting surface 200 designed with a greater aft angle sweep wing than the inner portion 210 of the forward lifting surface 200 such that the outer portion 220 of the forward lifting surface 200 is designed to stall first. The inner V shaped portion 210 of the forward lifting surface 200 never stalls because of the extra large dihedral designed into the inner portion 210. When the outer section 220 stalls, this total forward lifting surface 200 moves down, under much greater wing loading on the inner V section 210. The forward lifting surface action immediately restores the forward lifting surface 200 to a lifting condition. The total stalling action of the aircraft is a gentle up and down movement by the stalled and then, almost immediately, unstalled total forward lifting surface 200. The forward lifting surface 200 is unique, and illustrated in particular embodiments in FIGS. 1 through 3. The forward lifting surface 200 with its inner V shaped portion 210 and outer 220 approximately horizontal portion when flown to a stalled condition, the outer portion 220 will stall, as designed. A gentle nodding up and down of the aircraft results at a high angle of attack. The aft lifting surface 300 does not stall, as with conventional aircraft designs. The area ruled forward lifting elevator aircraft 100 relates to the design of an aircraft with improved flying characteristics in many functional ways. There are two lifting surfaces 200, 300: A lesser surface area 200 that is designed to stall first is disposed forward, and the main lifting surface 300 that is designed not to stall disposed aft. The inner V shaped portion 210 of the forward lifting surface 200 moves out from the fuselage 120 and also, the outer section 220 that is near to a horizontal surface moves out from the inner V shaped portion 210 of the forward lifting surfaces 200. These trailing edge surfaces or flight controls, both move up and down simultaneously for elevating the aircraft, or down to depress the nose of the aircraft at any time in flight. The center or inner V shaped portion 210 is designed to have an ability to differentiate the V trailing edge control surfaces and thereby activate a rudder action, to the nose of the aircraft, at any time during flight. The inner V shaped portion 210 of the forward shaped lifting surfaces 200 is swept forward, and at the junction 215 with outer surface 220, this surface changes to an aft swept design. This aft swept surface has a unique stalling sequence resulting from the design of the forward lifting surface 200 in relation to the aft lifting surface 300. The inner V shaped portion 210 of the forward lifting surfaces rudder 250 is a great advance on the rudder components of other previously existing aircraft wherein the rudders are attached to main wing tips.

Aft Lifting Surfaces:

The main aft wing surfaces 300 are situated aft on the fuselage 120 and ailerons 320 and trailing edge flaps 340 may be provided. The main aft wing 300 of the aircraft has a typical wing with ailerons 320 and flaps 340 similar to a conventional aircraft wing, but of reduced area. With the aft placed wing flaps 340 lowered, the aircraft 100 takes on a slight nose down attitude. At the extreme rear of the fuselage is a vertical surface of which the trailing edge 410 is set at an angle between vertical and horizontal. This area has a split flap action which acts as an air brake 400 and also adds a down force to the aircraft rear to counter the flap action of the main aft wing flaps 340 when activated. This action is anticipated and is countered by the vertical split flap 410 at the extreme rear of the aircraft, which is designed to handle this condition, and also add drag to slow the aircraft down prior to landing. In the main aft wing 300, fuel is carried between the main spars and may be augmented to carry fuel in the leading edge which is of fixed design, with deicing capacity, and also designed to withstand bird strikes.

Figure 1:
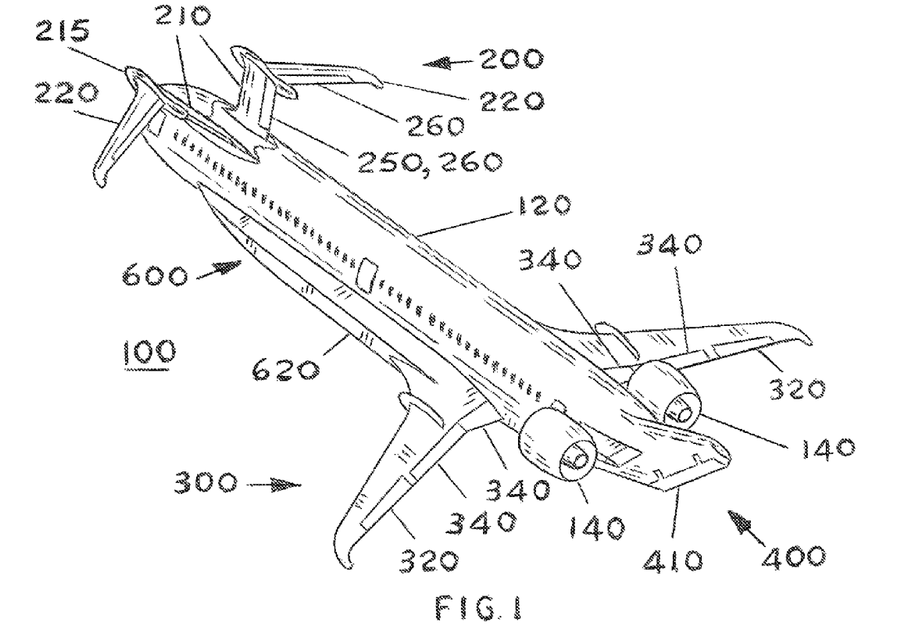
FIG. 1 is a perspective view of one embodiment looking down on the aircraft.

Airbrake:

An airbrake 400 at the rear of the aircraft provides aft fuselage flight controls with forward lifting elevator aircraft 100. The airbrake 400 provides a means for controlling a nose down pitching condition produced by lowering trailing edge flaps 340, using aft vertical flaps 410. The design of the aft vertical flaps 410 produces a tail-down moment to counter the aft lifting surface trailing edge flap action. In addition, the aft vertical flaps 410 add drag to the aircraft when deployed. The airbrake 400 is useful for rotating the rear end of the aircraft fuselage down in order to counter the aft lifting wing surface moment when aft lifting wing surface trailing edge flaps 340 are deployed in flight, and also to add drag to slow the aircraft down prior to landing. An overview of an embodiment of the present invention is shown in FIG. 1. Having aft lifting wing surface flaps 340 is a relatively new factor in the design of forward lifting elevator aircraft 100. The arrangement of lifting, stabilizing, and flight controlling wing surfaces 200 placed near the front of an aircraft, with the main lifting wing surfaces 300, placed aft, with trailing edge flaps 340, induce a nose down pitching moment to the aircraft. The advantage gained from the use of full main aft wing flaps 340 is made possible by the use of the airbrake 400 combination. The airbrake 400 comprises an aft vertical flap 410, with hinged moveable trailing edges, placed at an aft end of the aircraft fuselage. The aft vertical flap 410 is not in a true vertical position but the aft vertical flap is at an angle up and aft from the lower aft end of the aircraft fuselage. An acute angle is formed between the aircraft centerline and the forward edge of the aft vertical flap. The design gives a natural balance and slowing to the aircraft as desired in flight, but more importantly, prior to landing the aircraft. This total design leaves the forward control surfaces 200 of the forward lifting elevator aircraft 100 intact to do their intended functions of lifting their portion of the aircraft weight and controlling elevation of the total aircraft in flight. In addition, the airbrake 400 provides yaw control independent of these newly introduced aft controls. The airbrake 400 in combination with the area ruled forward lifting elevator aircraft 100 provides a flight control system on forward lifting elevator aircraft 100 to counter a nose down pitching condition when main aft wing flaps 340 are deployed to slow the aircraft down prior to landing.

Area Rule:

Area rule is a means to reduce airplane drag at speeds approaching Mach 1 and beyond. History indicates the case of the Convair F-102 airplane, designed to exceed Mach 1, but would not do so until additional area rule "bumps" were added at the aft end of the fuselage of the F-102. The redesigned F-102 became the Convair F-106 with area rule features designed into the airplane from the start; then the F-106 easily moved through Mach 1. In the late 1950s, the DC-8, 707, and 880 became subsonic transports. The Convair 880 became the Convair 990 airplane with speed approaching Mach 1 by adding area rule to the 880 airplane, by attaching two aerodynamically shaped portions to the wing trailing edge on each side of the fuselage. Previous designs with the main wing forward, and the smaller negative lifting wing at the rear, filling in the area gap between these two surfaces where the mid-fuselage should have the maximum area, does not optimize efficient aircraft design. The key is not to repeat the past but to discover a better design. Even the B-787, the latest civilian airliner, is basically of the same 50-year-old design. The B-787 has great advantages contained in the airplane's lighter weight structure, and virtually fatigue-free, non-metal structure. However, new aircraft need this invention's new novel discovery of a total rearranging of the whole airplane shape, gaining additional weight saving by having both wing surfaces to be lifting surfaces, reducing the area and weight, and utilizing new structural materials that are advantageous, and provide a greatly reduced fuselage maximum bending moment, and more readily adhere to the benefits of real area rule.

As depicted in FIGS. 1. 2, 3, and 4, the area ruled forward lifting elevator aircraft 100 relates to a completely new arrangement of a passenger or freight carrying aircraft with two positive lifting surfaces, fore 200 and aft 300. The forward surfaces 200 have elevator 260 and rudder 250 controls and are of lesser area than the main aft wing 300 which has ailerons 320 and flaps 340. A vertical split air brake flap 410 at the end of the fuselage also gives reaction to the aft main wing flaps 340 when employed. The fuselage 120 is of constant section, with area ruling applied throughout the total airplane length. This invention relates, in general, to a forward lifting elevator 260 and rudder 250 aircraft 100 with unique forward surfaces 200 and aft main wing 300, with a constant section fuselage 120 and air brake 400 at the rear fuselage controlling and countering the main aft wing flap action. All the above is contained by a total nose-to-tail area ruled design condition. Some embodiments of the area ruled forward lifting elevator aircraft 100 have the advantage of a constant section pressurized fuselage 120 with area ruling 600 the total length of the aircraft and an area ruled outer area 620 may be attached to most of the fuselage lengthwise. The total aircraft is area ruled 600 for reduced drag and is designed to fly at Mach 0.95. A similarly sized conventional aircraft with the same engine thrust would only fly at Mach 0.85. In one embodiment, with a much reduced passenger count such as a corporate jet, aircraft may have a 10,000 mile range. As shown in FIGS. 3, 4, 5, and 6, another principal attribute to this particular design of aircraft is to apply area ruling over the entire aircraft fuselage length. A means to employ fuselage length changes at approximately the mid-length of the fuselage, with the aircraft indicated in the various figures. This attribute may be viewed in FIG. 6 with the area ruled graph. A portion of the fuselage, shown flat 610 on the graph, may be removed from the fuselage length with a slight advantage to performance of the aircraft. The basic significance of the value of area ruling 600 is unaffected. This change, with the removal of one piece of fuselage section, would require two such pieces with the conventional aircraft, one section forward of the wing and one section aft. A principal feature is that area ruling 600 is applied over the total aircraft length beginning with the nose area as zero and the total aircraft section area is noted incrementally, moving aft along the fuselage. The area ruled outer area 620 starts about the forward wing area, and the area ruled outer area 620 is attached with the fuselage. This stub wing of the area ruled outer area 620 on each side of the fuselage moves aft, increasing in area to a midpoint on the fuselage. This added area continues aft to blend with the aft lifting wing 300. The landing gear wheel wells 630 also contribute to the process of area ruling 600. In addition bagged fuel may be carried aft of the main landing gear and also forward of the main landing gear on each side of the fuselage. Using seat numbers to describe fuselage length, 150 is ideal; 180 slight flat is showing; 250 would show a longer flat area. The graphical flat increased area would add some small drag factor. Compared to the conventional non-area ruled aircraft, this quantity would be minuscule. The area ruled forward lifting elevator aircraft 100 improves aircraft design by making a lighter aircraft design, with reduced total cost and reduced fuel burn. Area ruling 600 has a reduced drag on the aircraft some 200 mph, prior to Mach 1.00. Aircraft will, with added thrust, move through Mach 1.00 to Mach 1.12 cruise speeds, if required. As was previously discussed, a fix was discovered for fighter aircraft in the redesign of the F-102 to become a superior F-106. A fix was discovered for passenger aircraft such as the Convair 880 redesigned as the Convair 990. And now a new fix has been discovered and is available that further advances area ruling for medium to large transport aircraft that also advances previous designs for small transport type aircraft. With this, the normal cruise speed for the area ruled forward lifting elevator aircraft 100 may be Mach 0.95.

Advantages/Improvements:

Advanced future passenger aircraft should be an area ruled forward lifting elevator aircraft 100 comprising a fuselage 120; area ruling 600 throughout the length of the fuselage 120; an airbrake 400 at the rear of the fuselage; an aircraft propulsion system 140; and lifting surfaces that include a forward lifting 200 surface and an aft lifting 300 surface. The inner portion 210 of the forward lifting surfaces 200 moving outward from the top fuselage 120 with a V shape forming a large dihedral angle at the fuselage 120 wherein the inner portion of the forward lifting surfaces act as rudder 250 and also act as elevator 260. The inner V shaped portion 210 of the forward shaped lifting surfaces 200 is swept forward, and at the junction 215 with the outer surface 220, this surface changes to an aft swept design. The main aft lifting wing, forward lifting wing, and fuselage includes the area rule system described herein. The forward elevator 260 and rudder 250 up front and the main wing 300 with flaps 340 and ailerons 320 aft also utilizes an aft vertical air brake 400 to slow the aircraft prior to landing and controls the nose down action when the aft wing flap 340 is activated.

What is claimed is:

1. An aircraft comprising:
    area ruling throughout the length of the aircraft;
    a fuselage configured in shape for area ruling calculations and contribute to the area ruling throughout a length of the aircraft;
    at least two lifting surfaces including a forward lifting surface and an aft lifting surface wherein the aft lifting surface includes a larger surface area than the forward lifting surface and the forward lifting surface includes rudder and elevator components configured in shape to combine with the fuselage area ruling calculations and contribute to the area ruling throughout the length of the aircraft;
        wherein an inner portion of the forward lifting surface further includes a V shape formed with a left and right forward lifting surface adjacent to a fuselage forming a large dihedral angle with the fuselage where the inner left and right forward lifting surfaces attach with the fuselage, wherein the inner left and right forward lifting surface adjacent to the fuselage is additionally angled slightly forward from the fuselage attachment point, wherein an outer portion of the forward lifting surface includes an outward and an aft sweep such that a unique stalling sequence results from the design of the forward lifting surface in relation to the aft lifting surface and the outer portion of the forward lifting surface includes a slight anhedral angle;

wherein the forward lifting surface stalls prior to the aft lifting surface;

an airbrake at the rear of the fuselage configured in shape to combine with the fuselage area ruling calculations and contribute to the area ruling throughout the length of the aircraft;

wherein the area ruling throughout the length of the aircraft includes area ruling from the nose over the total length of the fuselage moving aft along the fuselage;

an area ruled outer area on each side of the fuselage moves aft increasing in area to a midpoint of the fuselage then continues aft blending with the forward and aft lifting surfaces; landing gear wheel wells are included in the area ruling calculation and contribute to the area ruling throughout the length of the aircraft;

the area ruled outer area on each side of the fuselage carries bagged fuel on each side of the fuselage within area ruling calculations and contribute to the area ruling throughout the length of the aircraft; and the constant section fuselage permits the area ruling with a minimum flat on the maximum curve at a midpoint on the aircraft length on the area ruled curve with miniscule change in drag factor; and an aircraft propulsion system configured in shape to combine with the fuselage area ruling calculations and contribute to the area ruling throughout the length of the aircraft.

2. The aircraft as set forth in claim 1 wherein:

a trailing portion of the inner portion of the forward lifting surface comprises the rudder and elevator wherein the inner portion comprises the rudder and also the elevator components and a trailing portion of the outer portion of the forward lifting surface comprises additional elevator components; and a trailing portion of the aft lifting surface includes aileron and flap components and wherein the airbrake at the rear of the fuselage includes a vertical surface set at an angle between vertical and horizontal such that the airbrake has a split flap action which acts to slow the aircraft and also adds a down force to the aircraft rear to counter the flap action of the aft lifting surface wing flap component.

3. The aircraft as set forth in claim 1 wherein:

the fuselage includes constant sections of pressurized tube fuselage that may be removed or inserted without affecting the basic significance of the area ruling value; and the aircraft propulsion system includes two jet engines attached with the rear of the fuselage.

4. The aircraft as set forth in claim 1 wherein:

the aircraft propulsion system includes two jet engines attached with the aft lifting surface.

5. The aircraft as set forth in claim 1 wherein:

the aircraft propulsion system includes two open propeller propulsion systems attached with the aft lifting surface.

6. The aircraft as set forth in claim 1 wherein:

a trailing portion of the inner portion of the forward lifting surface comprises the rudder and elevator wherein the inner portion controls the rudder and also the elevator components and a trailing portion of the outer portion of the forward lifting surface comprises additional elevator components;

a trailing portion of the aft lifting surface includes aileron and flap components and wherein the airbrake at the rear of the fuselage includes a vertical surface set at an angle between vertical and horizontal such that the airbrake has a split flap action which acts to slow the aircraft and also adds a down force to the aircraft rear to counter the flap action of the aft lifting surface wing flap component;

the fuselage includes constant sections of pressurized tube fuselage that may be removed or inserted without affecting the basic significance of the area ruling value; and the aircraft propulsion system includes two jet engines attached with the rear of the fuselage.

\* \* \* \* \*